No. 742,830. Patented November 3, 1903.

UNITED STATES PATENT OFFICE.

OLIVER W. BROWN, OF BLOOMINGTON, AND WILLIAM F. OESTERLE, OF MARION, INDIANA.

METALLURGICAL PROCESS.

SPECIFICATION forming part of Letters Patent No. 742,830, dated November 3, 1903.

Application filed May 14, 1903. Serial No. 157,176. (No model.)

*To all whom it may concern:*

Be it known that we, OLIVER W. BROWN, residing at Bloomington, and WILLIAM F. OESTERLE, residing at Marion, Indiana, citizens of the United States, have invented a certain new and useful Improvement in Metallurgical Processes; and we do hereby declare the following to be a full, clear, and exact description of the invention, such as will enable others skilled in the art to which it appertains to make and use the same.

Our invention relates to metallurgical processes, and particularly to the treatment in an electric or other suitable furnace of sulfid ores, whereby we are able to save a very high proportion of the values in metallic form and at the same time to secure as available by-products certain other valuable constituents of the ore and of the materials used in the operation which have heretofore been disregarded or wasted.

Our process is applicable especially to the reduction of zinc from its sulfid ores, (blende,) and by it we are able to dispense with the usual preliminary roasting and to perform the whole operation at one time in the electric or other suitable furnace at a great saving of time, trouble, electrical energy, and fuel. Moreover, the carbon and calcium employed being utilized in the formation of the valuable by-products calcium carbid and carbon disulfid that element of waste is eliminated, and the expense of the material being compensated for and the expenditure of electrical energy reduced the treatment of the zinc ores is rendered exceedingly profitable.

In the carrying out of our process we mix carbon (coke or coal) and lime with the zinc-blende in proportions varying, as hereinafter more particularly illustrated, according to the purity of the ore and the by-product desired. The mixture is placed in an electric furnace and heated in the usual manner to a temperature sufficiently high to produce the products desired, whereupon the zinc is reduced to a metallic form and volatilized out and condensed in the usual way, while the carbon and calcium are, under the conditions hereinafter set out, saved, together with the sulfur, in the form of calcium carbid and carbon disulfid, which are of well-known value. The reactions by which the zinc is saved and these different by-products secured vary according to the proportions used (molecular weights) and according as we use the calcium in the form of lime or limestone and may be illustrated by the following equations:

(*a.*) $ZnS + CaO + C = Zn + CaS + CO$,
(*b.*) $ZnS + CaO + 3C = Zn + CaC_2 + CO + S$,
(*c.*) $2ZnS + 2CaO + 7C = 2Zn + 2CaC_2 + CS_2 + 2CO$, or in case calcium carbonate (limestone) is used instead of the calcium oxid the reactions presumably take place according to the following equation:

(*d.*) $2ZnS + 2CaCO_3 + 7C = 2Zn + 2CaC_2 + CS_2 + 2CO + 2CO_2$.

It will thus be seen that while we obtain the zinc in metallic form without the preliminary roasting we also utilize the carbon, calcium, and sulfur in the formation of the valuable by-products calcium carbid and carbon disulfid. Thus we obtain in one economic operation the three valuable products zinc, calcium carbid, and carbon disulfid.

Wherefore, having thus fully disclosed our invention, what we claim as new, and desire to secure by Letters Patent of the United States, is—

1. The process of simultaneously producing metallic zinc and a carbid, which consists in mixing with the zinc ore, carbon and an oxid of a metal having a greater affinity for carbon than for the zinc, and then heating the mixture to a temperature sufficient to produce the products.

2. The process of simultaneously producing metallic zinc and calcium carbid, which consists in mixing the zinc ore with carbon and lime and heating the mixture to a temperature sufficient to produce the products.

3. The process of simultaneously producing metallic zinc and calcium carbid, which consists in mixing zinc-blende with carbon and lime, and heating the mixture to a temperature sufficient to produce the products.

4. The process of simultaneously producing metallic zinc and calcium carbid, which consists in mixing zinc-blende with carbon and limestone, and heating the mixture to a temperature sufficient to produce the products.

5. The process of simultaneously producing metallic zinc, calcium carbid and carbon disulfid, which consists in mixing zinc-blende, carbon and an oxid of calcium, and then heating the mixture to a temperature sufficient to produce the products.

6. The process of simultaneously producing metallic zinc, calcium carbid and carbon disulfid, which consists in mixing zinc-blende, carbon and lime, and then heating the mixture to a temperature sufficient to produce the products.

7. The process of simultaneously producing metallic zinc, calcium carbid and carbon disulfid, which consists in mixing two parts zinc-blende, seven parts of carbon and two parts of lime, and heating the mixture.

8. The process of simultaneously producing metallic zinc, calcium carbid and carbon disulfid, which consists in mixing in the proportion of two molecular weights of zinc-blende, seven molecular weights of carbon and two molecular weights of lime, and heating the mixture in an electric furnace.

In testimony whereof we affix our signatures to this specification in the presence of two witnesses.

OLIVER W. BROWN.
WILLIAM F. OESTERLE.

Witnesses:
  HARRY A. AXTELL,
  ROBERT E. LYONS.